May 22, 1956 W. B. WOLF 2,746,760
VEHICLE STEERING STRUCTURE
Filed March 15, 1954 2 Sheets-Sheet 1
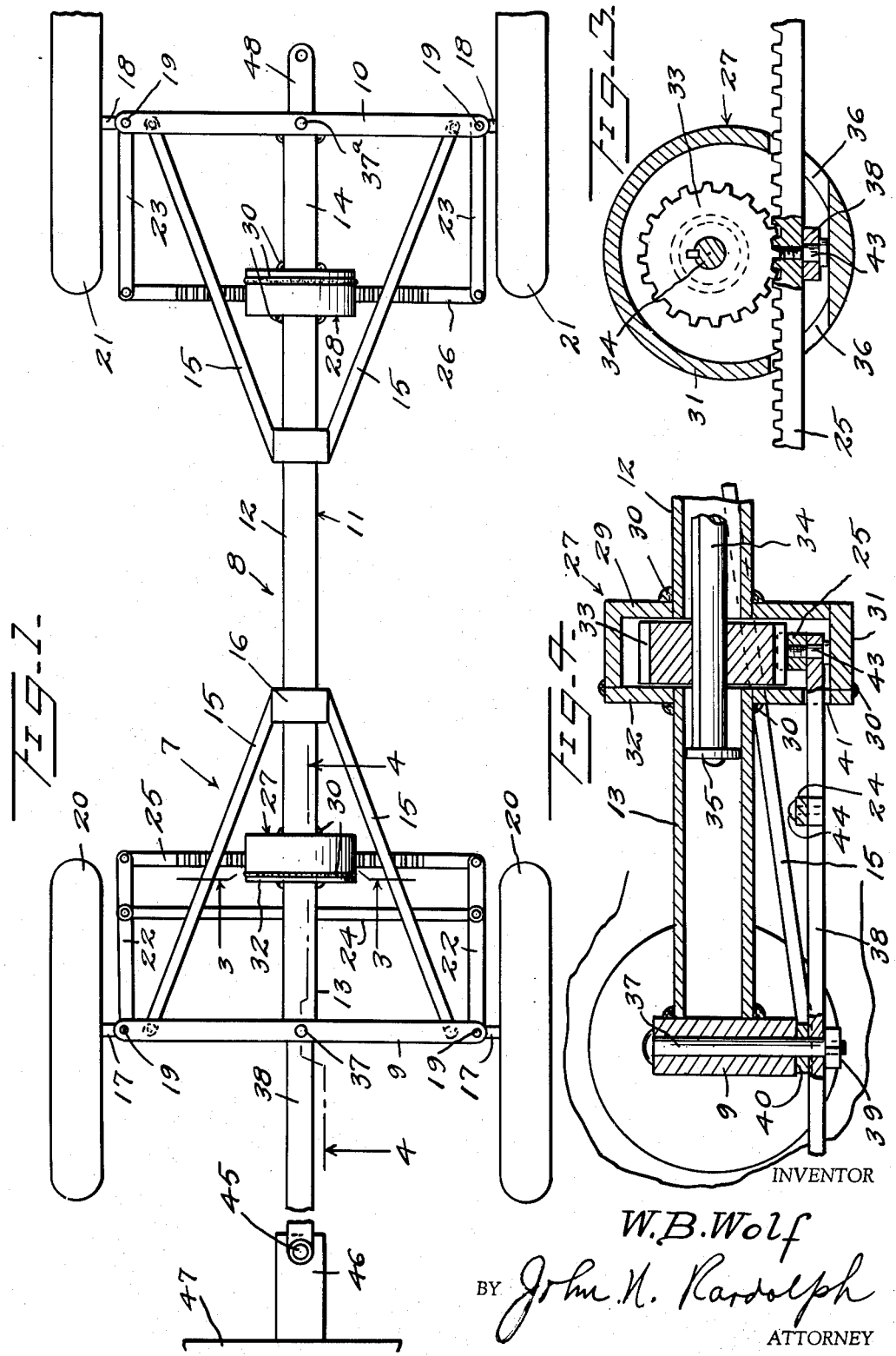
INVENTOR
W. B. Wolf
BY John N. Randolph
ATTORNEY May 22, 1956   W. B. WOLF   2,746,760
VEHICLE STEERING STRUCTURE
Filed March 15, 1954   2 Sheets-Sheet 2
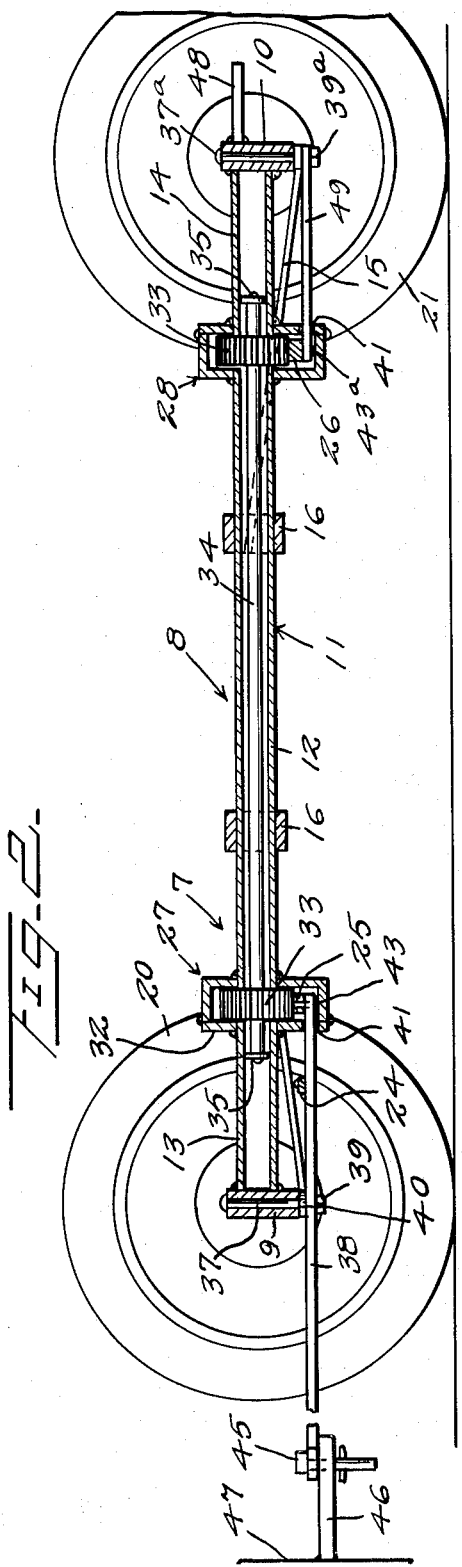
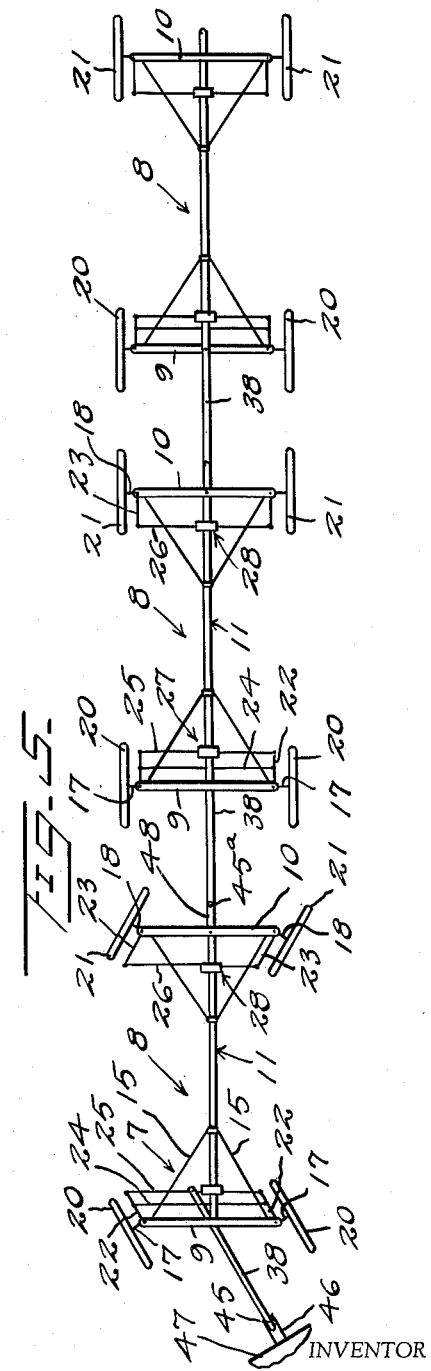
INVENTOR
W. B. Wolf
BY John N. Randolph
ATTORNEY

United States Patent Office 2,746,760
Patented May 22, 1956

2,746,760

VEHICLE STEERING STRUCTURE

William B. Wolf, Grafton, Wis.

Application March 15, 1954, Serial No. 416,252

2 Claims. (Cl. 280—99)

This invention relates to a novel steering structure for four wheeled trailer vehicles and more particularly to a mechanism of extremely simple construction for effecting a steering of both the front and rear wheels of a vehicle so that the rear wheels will follow substantially in the tracks of the front wheels in executing a turn.

Still a further object of the invention is to provide a steering mechanism whereby a trailer vehicle may be readily backed and accurately turned in either direction while backing.

Another object of the invention is to provide a steering mechanism which will enable a trailer vehicle to turn about a much shorter radius than would otherwise be possible and through the use of which a number of trailer vehicles may be drawn in tandem and so as to substantially track one another.

Various other objects and advantages of the invention will hereinafter become more fully apparent from the following description of the drawings, illustrating a presently preferred embodiment thereof, and wherein:

Figure 1 is a plan view of the chassis and wheels of a four wheeled trailer type vehicle shown equipped with the steering mechanism;

Figure 2 is a longitudinal substantially central sectional view thereof;

Figure 3 is an enlarged fragmentary cross sectional view taken substantially along a plane as indicated by the line 3—3 of Figure 1;

Figure 4 is an enlarged fragmentary longitudinal sectional view taken substantially along a plane as indicated by the line 4—4 of Figure 1, and Figure 5 is a plan view of plurality of the trailer vehicles equipped with the steering mechanism and connected in tandem behind a draft vehicle.

Referring more specifically to the drawings, for the purpose of illustrating a preferred application of the steering mechanism, designated generally 7 and comprising the invention, a trailer vehicle chassis designated generally 8 is illustrated in the drawings and, as best seen in Figure 1, includes a front axle 9 and a rear axle 10. The chassis 8 also includes a tubular reach 11, composed of an intermediate portion 12 and end portions 13 and 14, which extends between and is connected at its ends to the intermediate portions of the axles 9 and 10. The reach 11 is braced relatively to the axles 9 and 10 by pairs of diagonal braces 15 which are secured to the axles near the ends thereof and which converge inwardly relatively to one another and have adjacent ends secured to collars 16 which are disposed around and secured to the intermediate reach section 12 at points spaced from the ends thereof.

Wheel spindles 17 and 18 are swingably connected to the ends of the axles 9 and 10, respectively, by vertically disposed pivots 19 for swinging movement of said spindles relatively to the axles in substantially horizontal planes. Front ground engaging wheels 20 are journaled on the front spindles 17 and rear ground engaging wheels 21 are journaled on the the rear spindles 18.

Arms 22 are fixed to the inner ends of the spindles 17 and extend rearwardly from the ends of the axle 9 at substantially a right angle to the spindles. Arms 23 are similarly fixed to and extend forwardly from the rear spindles 18, as seen in Figure 1. The front arms 22 are connected at corresponding points spaced from their rear free ends by a tie rod 24 and are also connected at their rear free ends by a rack bar 25 forming a second tie rod. The forward free ends of the rear arms 23 are connected by a rack bar 26 which additionally function as a tie rod for said arms, and it will be readily apparent that the rack bar 25 may be similarly utilized, in which case the tie rod 24 may be dispensed with. The members 24, 25 and 26 extend beneath the reach 11.

Gear housings 27 and 28 are interposed in the reach 11 between the reach sections 12 and 13 and 12 and 14, respectively. Each of said gear housings includes an inner wall 29 which is secured in any suitable manner as by welding as indicated at 30 to an end of the reach section 12 which opens into the gear housing through said inner wall 29. Each gear housing has a surrounding wall 31 which projects outwardly from the inner wall 29 and an outer side wall 32 which is secured by welding as seen at 30 to one of the end sections 13 or 14 and which end section opens into the gear housing and is disposed in alignment with the intermediate section 12. The outer wall 32 of each housing is secured as by welding as seen at 30 to the surrounding wall 31 for connecting the reach sections 13 and 14 to the intermediate reach section 12 and for assembling the gear housings 27 and 28 after the parts contained within said housings and within the reach 11 are in position.

Each of the gear housings contains a gear or pinion 33 which is rotatably disposed therein. A splined shaft 34 extends loosely through the reach section 12 and slidably and non-turnably through the pinions 33 and is preferably provided with heads 35 at the ends thereof which are located within the reach sections 13 and 14 in spaced apart relationship to the pinions, to enable the shaft and pinions to be used with reaches of different lengths for accommodating chassis of different length wheel bases. At least one of the heads 35 is removable for applying the shaft 34 to the pinions.

As seen in Figure 3, the bottom portions of the walls 31 of both housings 27 and 28 are provided with spaced horizontally aligned slots 36 through which the rack bars loosely extend, the rack bar 25 extending through the housing 27 and the rack bar 26 extending through the housing 28. Said rack bars are disposed with their teeth in meshing engagement with the teeth of the pinions 33.

A bolt 37 extends downwardly through the central portion of the front axle 9 and extends loosely through a draft tongue 38, at a point spaced from the ends of said tongue. The tongue 38 is supported on the bolt 37 by a nut 39 and a washer 40 may be provided on said bolt between the tongue and axle 9. The wall 32 of the housing 27 is provided with a slot 41. The slot 41 communicates with the slots 36 and said slots accommodate the rear end of the tongue 38 which is swingably disposed therein. The rear portion of the tongue 38, which is normally disposed in the housing 27, is pivotally connected by a fastening 43 to the intermediate portion of the rack bar 25, which is disposed thereabove. A portion of the tongue 38 is also pivotally connected by a fastening 44 to the intermediate portion of the tie rod 24. The forward end of the tongue 38, substantially in advance of the front axle 9, is adapted to be connected by a coupling pin 45 to a draft bar 46 of a tractor or other prime mover, a rear portion 47 of which is shown in Figures 1, 2 and 5.

A fixed, relatively short drawbar 48 is secured to and extends rearwardly from the intermediate portion of the rear axle 10. A lever 49, corresponding to the rear portion of the tongue 38, has a rear end swingably supported beneath the intermediate portion of the rear axle 10 by a bolt 37a and nut 39a, corresponding to the bolt 37 and nut 39. The other end of the lever 49 is swingably accommodated in the slots 41 and 36 of the rear gear housing 28, in the same manner that the rear end of the tongue 38 is accommodated in the forward housing 27. The forward end of the lever 49 is connected to the intermediate portion of the rack bar 26 by a fastening 43a, in the same manner that the fastening 43 connects the tongue 38 to the rack bar 25. The rack bar 26 extends transversely through the housing 28 and is disposed beneath and in meshing engagement with the rear pinion 33, which is contained in the housing 28. The lever 49 assists in maintaining the rack bar 26 properly in meshing engagement with the pinion 33, and its mounting 37a, 39a and 43a enables the tongue 38 to be interchangeably mounted with the lever 49, so that the trailer vehicle chassis 8 may be pulled from either end.

From the foregoing it will be apparent that when the tractor or draft vehicle 47 is turned, as for example to the left from its straight line position of Figure 1 to its left turning position of Figure 5, that the tongue 38 of the vehicle chassis 8, which is coupled to the drawbar 46 of the draft vehicle, will be swung counterclockwise about the pivot 37 from its position of Figure 1 to its position of Figure 5. This will cause the parts 17, 22, 24 and 25 to move from their positions of Figure 1 to their positions of Figure 5 for turning the front wheels 20 to the left. This movement of the rack bar 25 will be from right to left as seen in Figure 3 and will cause the pinions 33 and shaft 34 to be rotated clockwise, so that the rack bar 26 will be displaced laterally in the same direction as the rack bar 25 to swing the arms 23 and spindles 18 in the opposite direction to the direction of movement of the arms 22 and spindles 17, so that the rear wheels 21 will be swung in the opposite direction or to the right, as seen in Figure 5. Thus, the rear wheels 21 will swing and cause the rear end of the chassis 8 to move in the opposite direction to the direction of movement of the forward end of the chassis. The front end of the chassis will execute a turn about a wider radius than that of the draft vehicle 47 so that as the draft vehicle thereafter again commences to move in a straight line, the tongue 38 will be swung in the opposite direction or clockwise about its pivot 37 initially past a straight line position, thus causing the rear wheels 21 to be swung to the left from their right turn positions of Figure 5. Consequently, the rear wheels 21 will substantially track the front wheels 20 in the turning movement of the vehicle chassis 8 and until the front and rear wheels have again assumed positions substantially in alignment with the draft vehicle wheels. A right turn is accomplished in the same manner as previously described except that the parts move in the opposite direction to their direction of movement for a left turn.

The short coupling bar 48 which projects from the rear axle 10, corresponds substantially to the coupling bar 46 so that any number of corresponding vehicle chassis 8 may be coupled in tandem as illustrated in Figure 5, with each vehicle chassis, located behind the one attached directly to the draft vehicle, having its tongue 38 connected by a coupling pin 45a at the forward end of said tongue to the drawbar 48 of the vehicle chassis disposed next in front thereof. Accordingly, each preceding trailer chassis 8 will substantially track the one by which it is drawn. For example, referring to Figure 5, after the rear end of the front chassis 8 has moved to the right of its position of Figure 5, the front wheels of the second chassis will turn to the right to follow the rear wheels of the first chassis and the rear wheels of the second chassis will turn to the left initially so as to be able to track the front wheels of the second chassis, which front wheels will continue to track or substantially track the rear wheels of the front chassis 8. Each succeeding trailer chassis 8 will likewise follow in a like manner.

Various modifications and changes are contemplated and may obviously be restorted to, without departing from the spirit or scope of the invention as hereinafter defined by the appended claims.

I claim as my invention:

1. A steering mechanism for a four wheeled type trailer vehicle comprising a trailer vehicle chassis including a front axle, a rear axle and a tubular reach interposed between and secured at its ends to intermediate portions of said axles, wheel spindles swingably connected to the ends of said axles for swinging movement in horizontal planes, ground engaging front and rear wheels journaled on the wheel spindles of the front and rear axles, respectively, arms fixed to and projecting from the pivoted ends of said wheel spindles and at substantially right angles to the axes of the wheel spindles, the arms of said front axle spindles extending rearwardly and the arms of said rear axle spindles extending forwardly relatively to the front and rear axles, respectively, rack bars having ends pivotally connected to the free ends of said arms, one of said rack bars connecting the front axle arms and the other rack bar connecting the rear axle arms, said rack bars forming tie rods, a shaft journaled in said reach, front and rear pinions connected to said shaft for rotation therewith and supported by the shaft in meshing engagement with the rack bars of the front and rear axle arms, respectively, a draft tongue swingably connected at a point spaced from its ends to the intermediate portion of the front axle for swinging movement in a horizontal plane and having a rear end pivotally connected to the intermediate portion of the front rack bar and a forward end adapted to be connected to a draft vehicle whereby the front and rear wheels of the vehicle chassis will be steered simultaneously by a swinging movement of said tongue and with the rear wheels steerably turned in the opposite direction to the front wheels, said shaft having splined end portions extending through and to beyond remote sides of said pinions whereby reaches of different lengths may be employed for trailer chassis having wheel bases of different lengths, said reach comprising an intermediate section and end sections, pinion housings interposed in said reach between the end sections and intermediate section thereof and forming a part of the reach, said pinions being rotatably disposed in said housing and maintained thereby against movement longitudinally of the reach, one of said housings having a forwardly opening slot for swingably accommodating the rear portion of said tongue and both of said housings having transversely aligned slots for slidably accommodating the rack bars.

2. A steering mechanism as in claim 1, and a short draft bar fixed to and extending rearwardly from the intermediate portion of said rear axle and adapted to be coupled to the forward end of the tongue of a corresponding steering mechanism of a second trailer vehicle chassis disposed in tandem behind said first mentioned chassis.

References Cited in the file of this patent

UNITED STATES PATENTS

| 1,093,130 | Hays | Apr. 14, 1914 |
| 1,276,422 | Scott et al. | Aug. 20, 1918 |
| 1,612,589 | Laird | Dec. 28, 1926 |
| 2,572,966 | Avery | Oct. 30, 1951 |

FOREIGN PATENTS

| 375,086 | Italy | Sept. 21, 1939 |
| 147,632 | Switzerland | Sept. 1, 1931 |